Aug. 1, 1967 K. KEMPER 3,334,288
FUSING ARRANGEMENT FOR A TRANSISTOR-REGULATED POWER SUPPLY
Filed April 28, 1964 2 Sheets-Sheet 1
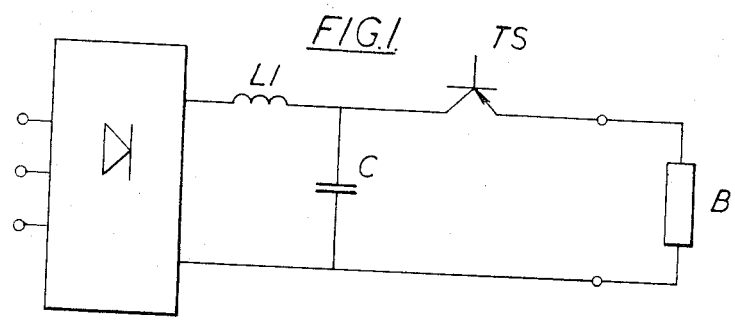
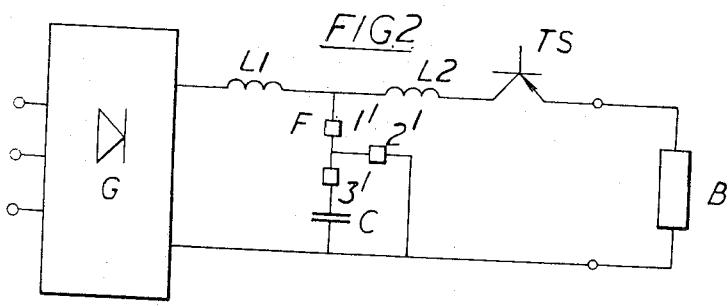
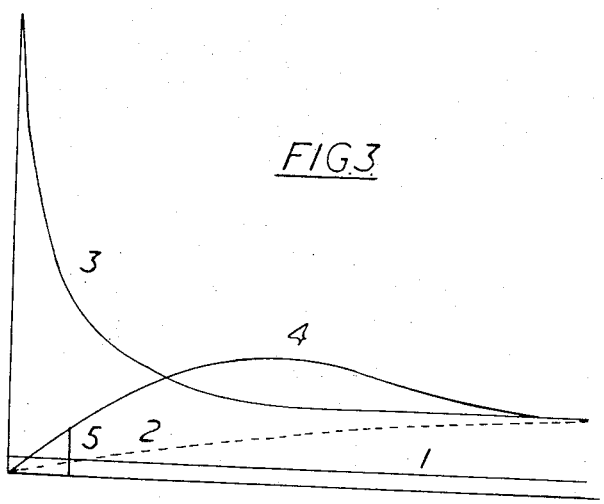
Inventor
KAREL KEMPER
By *Percy P. Lantzy*
Attorney Aug. 1, 1967 K. KEMPER 3,334,288
FUSING ARRANGEMENT FOR A TRANSISTOR-REGULATED POWER SUPPLY
Filed April 28, 1964
2 Sheets-Sheet 2
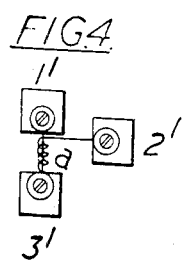
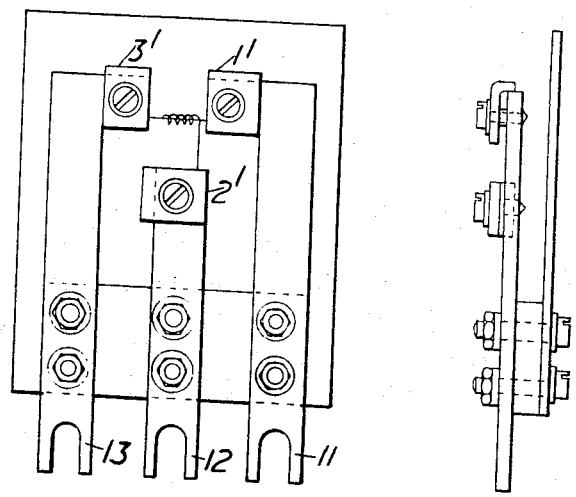
Inventor
KAREL KEMPER
By *Percy P. Lantzy*
Attorney United States Patent Office 3,334,288
Patented Aug. 1, 1967

3,334,288
FUSING ARRANGEMENT FOR A TRANSISTOR-REGULATED POWER SUPPLY
Karel Kemper, Voorschoten, Netherlands, assignor to International Standard Electric Corporation, New York, N.Y., a corporation of Delaware
Filed Apr. 28, 1964, Ser. No. 363,175
Claims priority, application Netherlands, May 14, 1963, 292,711
6 Claims. (Cl. 321—11)

ABSTRACT OF THE DISCLOSURE

An arrangement which provides a short fuse in series with the filter capacitor of a transistor-regulated power supply and includes means for transferring the discharge current of the capacitor away from the series transistor, if the fuse blows and a persisting arc forms.

This invention relates to fuses and more particularly to fusing of transistorized power supplies.

In a circuit arrangement for feeding a load with direct current produced by a rectifier with the usual smoothing filter, where the regulatory circuitry includes a transistor (or combination of transistors) in series with the load, it often happens that a short circuit across the load terminals will cause a very strong discharge-current impulse, derived from the parallel capacitor of the smoothing filter, to be applied to the transistor.

At high power, the maximum allowable collector voltage for the transistor is only a fraction of the output direct-current voltage of the rectifier, so that blocking of this voltage by the transistor is not possible.

This discharge-current impulse may easily cause the transistor to become defective. A need therefore exists for protection of the transistor.

Connecting a fuse in series with the filter capacitor does not solve the problem. Ordinary fuses are not only too slow but also possess too high a resistance. When such a fuse is connected in series with the capacitor, the smoothing action of the filter will be lost.

Of course, a fuse of low resistance may be connected in series with the capacitor, e.g. a fuse wire whose length is not too great. A disadvantage hereof is that, at high power, a persisting arc is formed upon the burning down of the fuse wire by the discharge-current impulse. The creation of this arc is a direct consequence of having a short fuse wire, for maintaining the low ohmic value.

An object of the present invention is to provide means for protecting the regulating transistor of a D.C. power supply.

Another object of the present invention is to provide a short fuse in series with the filter capacitor of a transistor-regulated power supply and means for transferring the discharge current of the capacitor away from the series transistor, if the fuse blows and a persisting arc forms.

The foregoing objects are accomplished by inserting an additional choke coil of low inductance between the usual choke coil of the smoothing filter and the regulating transistor, and further, providing in the immediate vicinity of the short fuse wire, which is connected in series with the capacitor of the smoothing filter, a loose electrode contacting a shunt across the capacitor, in such a way that, when the short fuse wire burns down, an arc which may appear between the fuse terminals is taken over by the loose electrode.

The above-mentioned and other features and objects of this invention will become more apparent by reference to the following description taken in conjunction with the accompanying drawings, in which:

FIGURE 1 is a simple schematic circuit diagram of a transistor-regulated power supply without protection for the transistor (or combination of transistors);
FIGURE 2 is the same schematic circuit diagram as FIGURE 1 but showing the protective device in accordance with the invention;
FIGURE 3 is a plot of curves explanatory of the problem and solution thereof;
FIGURE 4 illustrates the fuse in accordance with the invention; and
FIGURE 5 shows a practical mechanical embodiment of the fuse in accordance with the invention.

FIGURE 1 is a simplified diagram of a transistor-regulated power supply, the output voltage or current of which must satisfy a certain requirement.

To this end, the collector voltage of transistor TS reduces the direct voltage, obtained from the non-regulated rectifier G, to such an extent that this predetermined requirement is satisfied.

The combination of the choke coil L1 and the capacitor C make up the smoothing filter by means of which the greater part of the ripple voltage is removed.

If a short circuit occurs in the load circuit (B), at low power the regulating transistor TS may usually be controlled in such a way that it completely blocks, thus preventing an overload from occurring.

At high power, however, the maximum allowable collector voltage of TS is only a fraction of the output D.C. voltage so that the protection furnished at low power cannot then be provided.

Accordingly, when a short circuit occurs, a very large current peak will occur in the capacitor C, transistor TS and the short circuit. This discharge-current pulse may easily be 50 times as large as the normal current and is usually detrimental to the transistor TS.

As mentioned above, an ordinary fuse cannot be connected in series with the capacitor since the smoothing action of the filter would be lost.

FIGURE 2 shows the diagram of FIGURE 1 in which the protection in accordance with the invention is supplied. As seen in this figure, the fuse F (which is detailed in FIGURE 4) is inserted in series with the capacitor C, while an additional choke coil L2 of low inductance is placed in series with the transistor (or combination of transistors) TS.

FIGURE 3 shows curves illustrating the performance of the invention. Curves 1 and 2 represent the maximum load current and the stationary short-circuit current respectively. Curve 3 represents the discharge current resulting from the capacitor C for a short circuit across the load terminals, if no protection is used. By adding the additional choke coil L2, the discharge current of capacitor C is made to assume the shape of curve 4.

As soon as this discharge current reaches a predetermined value, e.g. point 5, the fuse wire between the points 1' and 3' (see FIGURE 4) will burn down.

If a short circuit across the load terminals causes an arc to be formed after the fuse wire burns down, this arc will be taken over by the loose electrode in accordance with the invention. Thise loose electrode is electrically insulated, and helically wound round the fuse wire and connected to a shunt across the capacitor.

The result is that the transistor or combination of transistors is protected against a large peak current.

The complete phenomenon takes place in the order of 1 millisecond.

The stationary short-circuit current 2 of the rectifier may be switched off by quick-acting fuses in the rectifier itself.

FIGURE 5 shows a practical mechanical embodiment of the fuse in accordance with the invention in which terminal straps 11, 12 and 13 are connected respectively to terminals 1′, 2′ and 3′ of the fuse.

While the principles of the invention have been described above in connection with specific apparatus, it is to be clearly understood that this description is made only by way of example and not as a limitation on the scope of the invention as set forth in the objects thereof and in the accompanying claims.

I claim:
1. A transistor-regulated DC power supply comprising a rectifier, a smoothing filter coupled thereto, said smoothing filter including a series choke coil and a shunt capacitor, a transistorized-regulator circuit coupled in series with said choke coil of said smoothing filter, with low-resistance fusing means connected in series with said capacitor, and means coupled to said fusing means to cause any arc created during the blowing of said fuse to be transferred to a conductive branch bypassing said shunt capacitor.

2. A transistor-regulated DC power supply as in claim 1 and further including means to alter the current-versus-time characteristic of any discharge of said shunt capacitor occurring because of a short-circuit at the output, whereby said current will start at a minimum level and slowly rise to a maximum instead of starting at an extremely high value and exponentially decaying.

3. A transistor-regulated DC power supply comprising a rectifier, a smoothing filter coupled thereto, said smoothing filter including a series choke coil and a shunt capacitor, a short fuse wire connected in series with said shunt capacitor, with an insulated loose electrode wound helically around said fuse wire and connected to a shunt across said capacitor, a transistorized-regulator circuit coupled in series with said choke coil of said smoothing filter, and a load.

4. A transistor-regulated DC power supply as in claim 3 and further including a second choke coil of low inductance coupled between the choke coil of said smoothing filter and said transistorized-regulator.

5. In a transistor-regulated power supply, a low-resistance short-length protective fuse connected in series with the shunt capacitor of a smoothing filter contained therein, with means provided for extinguishing any arc occurring after the blowing of said short fuse.

6. A power supply according to claim 5, wherein said extinguishing means includes an insulated loose electrode in the form of a helical wire wound around said short-length protective fuse, whereby, if an arc occurs after blowing of said short fuse, said insulation will be burned away thereby diverting said arc.

References Cited
UNITED STATES PATENTS

| | | | |
|---|---|---|---|
| 2,400,408 | 5/1946 | Haefelfinger | 200—118 |
| 3,218,414 | 11/1965 | Swain et al. | 200—120 |
| 3,256,408 | 6/1966 | Stumpe et al. | 200—120 |

JOHN F. COUCH, *Primary Examiner.*

W. H. BEHA, *Assistant Examiner.*